Jan. 21, 1947.  S. T. EKHOLM  2,414,512
CORN PICKER
Filed Oct. 28, 1943  2 Sheets-Sheet 1
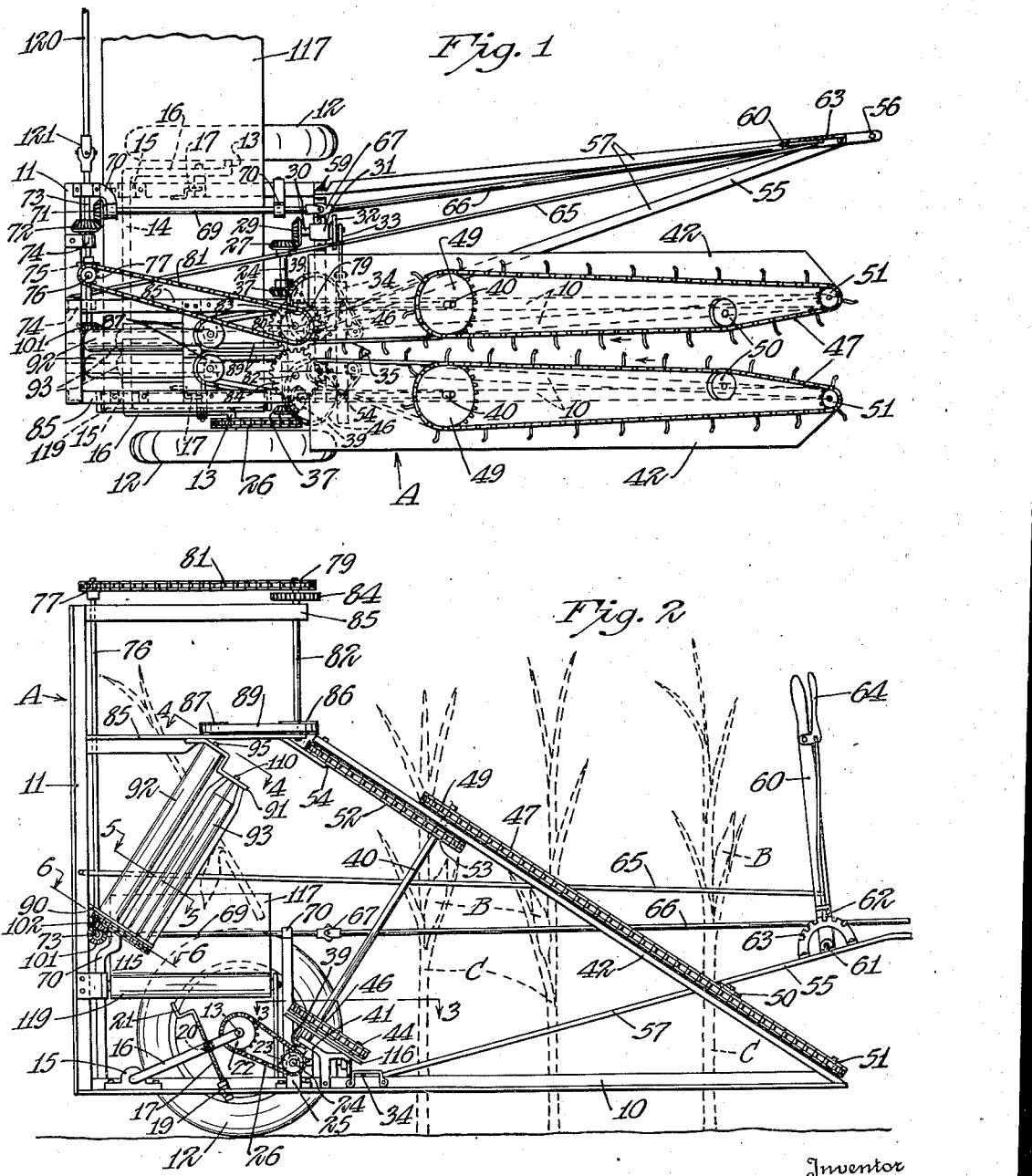

Jan. 21, 1947. S. T. EKHOLM 2,414,512
CORN PICKER
Filed Oct. 28, 1943 2 Sheets-Sheet 2
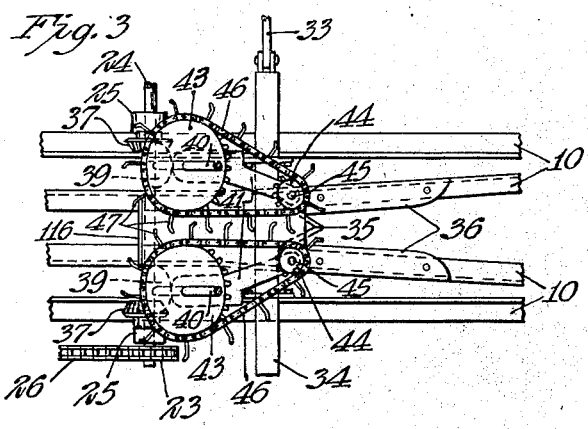
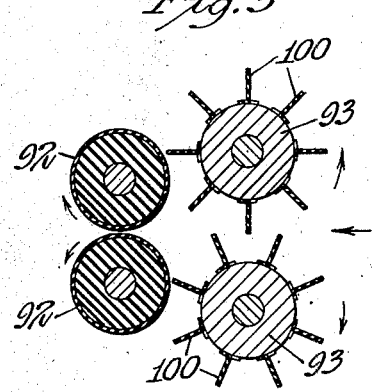
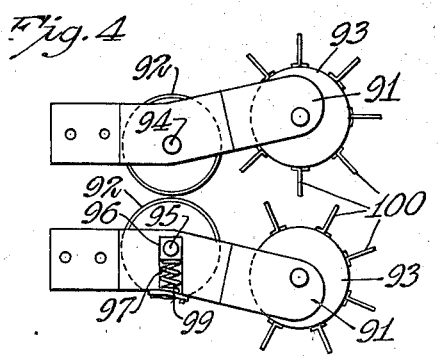
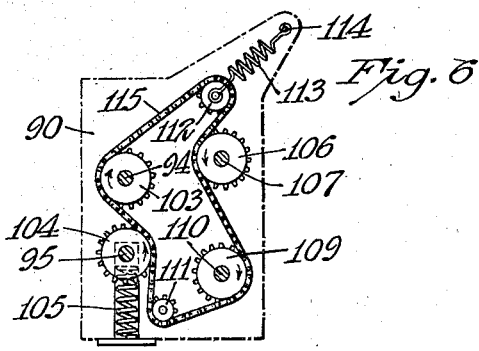
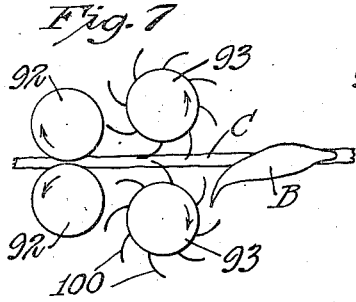
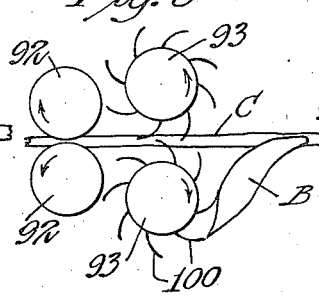
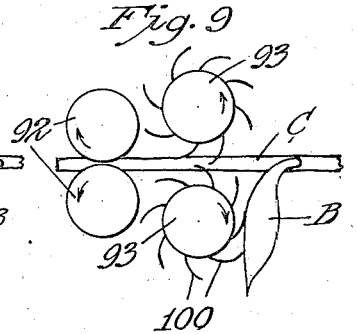
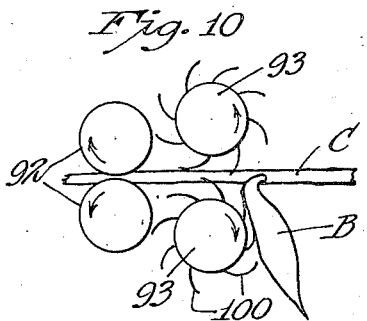
Inventor
Steven T. Ekholm
By Robert M. Dunning
Attorney Patented Jan. 21, 1947

2,414,512

UNITED STATES PATENT OFFICE 2,414,512

CORN PICKER

Steven T. Ekholm, St. Paul, Minn.

Application October 28, 1943, Serial No. 507,979

13 Claims. (Cl. 56—107)

1

My invention relates to an improvement in a corn picker, wherein it is desired to provide a harvesting machine for corn, which is capable of picking either green or ripe corn from the corn stalks without removing the husks therefrom.

Various types of corn harvesting machines have previously been patented. Most of these machines employ rollers for pulling the corn from the corn stalks. While such devices are commonly used for the picking of dry corn, most such constructions are not acceptable for use in picking green corn, as the rollers would damage or crush the ears of green corn.

It is the object of the present invention to provide a corn picking device employing a plurality of pairs of rollers arranged to operate in combination. One pair of rollers is provided for engaging the stalks of corn and for drawing the stalks through the machine. A second set of rollers is provided to engage the ears of corn being drawn through the machine by the first pair of rollers. This second set of rollers operates to bend the ears of corn away from the corn stalks, and accordingly to break the ears from the stalk at the base of the shanks of the ears.

A feature of the present invention resides in the fact that the corn stalks are drawn upwardly by the pulling rollers through the buffer rollers. The pulling rollers engage the corn stalks at a point substantially spaced above the ears and draw the stalks upwardly and rearwardly, these stalks passing between the buffer rollers. As the stalks approach at an acute angle to the axes of the rollers, the stalks are engaged by successively lower portions of the rollers during their travel between the rollers. Thus, while the stalks are first engaged between the upper extremities of the rollers, this engagement moves lower and lower upon continued rotation, the lower ends of the stalks being engaged between the rollers near the lower ends thereof. The buffer rollers rotate in such a manner as to engage the upper ends of the ears and to bend these ears outwardly from the stalk and downwardly until the ears break away from the stalk at the base of the shank of the ear.

A feature of the present invention resides in the fact that as the stalks are drawn upwardly and rearwardly between the buffer rollers, the ears are bent downwardly with a gentle action which does not injure the kernels on the corn. The ears drop onto a conveyor located beneath the buffer rollers and are conveyed by this conveyor to any suitable receptacle.

2

A feature of the present invention resides in the fact that my device may operate either as a hand fed picker to pick the ears from the stalks, or may be constructed to travel over a field of corn to harvest the ears of corn from the stalks.

A further feature of the present invention lies in the fact that the rolls which engage the ears of corn may be provided with outwardly extending flaps or fins which are capable of bending the ears with respect to the stalk. These fins are formed of flexible material or flexible and resilient material so that they normally assume a regular shape, but may flex under pressure to permit the stalks and leaves attached to the stalks to pass therebetween.

A feature of the present invention lies in the fact that the ears of corn are not drawn between any pairs of rollers. Accordingly, the ears are not damaged and the kernels of corn are not crushed. The ears engage only the buffer rollers which merely bend the ears away from the stalk, rather than to draw the ears into position between the rollers. As a result the corn is harvested intact and uninjured. As the ears do not pass between the buffer rollers, the husks remain intact.

An additional feature of the present invention lies in the fact that the rollers which engage the corn stalks and which bend the ears of corn away from the stalks are positioned either vertically, or with their forward ends substantially above the rear ends thereof. In other words, as the stalks of corn are fed into the rollers the upper portion of the stalks are engaged by the uppermost portions of the rollers. In this respect the arrangement is substantially different from the more common arrangement in which the stalks are engaged at a point near the ground and the rolls work upwardly on the stalks.

These and other objects and novel features of my invention will be more clearly and fully set forth in the following specification and claims.

In the drawings forming a part of my specification:

Figure 1 is a top plan view of a corn harvester or picker, embodying my new construction.

Figure 2 is a side elevational view of the corn picker illustrated in Figure 1, with the rear wheel removed, and showing the relative relation between the harvester and standing stalks of corn.

Figure 3 is a sectional view of a portion of the mechanism, the position of the view being indicated by the line 3—3 of Figure 2.

Figure 4 is a diagrammatic view of one end of the rollers, the position of the view being indicated by the line 4—4 of Figure 2.

Figure 5 is a sectional view through the rollers, the position of the section being indicated by the line 5—5 of Figure 2.

Figure 6 is a view of the roller drive mechanism, the position of the view being indicated by the line 6—6 of Figure 2.

Figures 7, 8, 9, and 10 are similar views through the rollers, showing successive steps in the operation of passing stalks through the rollers and the ear being removed.

The corn picker A, illustrated in Figures 1 and 2 of the drawings, includes a frame including base frame members 10 and vertical frame members 11. The base frame members 10 may be arranged as illustrated in Figure 3 of the drawings to direct corn stalks therebetween. The vertical frame members are provided to act as a support for the stalk conveying mechanism, and the pulling rollers and the buffer rollers used in separating the ears from the stalks. The frame members 10 and 11 also act as a support for the various bearings and drive mechanisms and for the conveyor used in conveying the ears of corn from beneath the rollers.

The frame members 10 are supported by a pair of wheels 12 mounted on aligned pivotal axes 13 on a U-shaped axle member 14. This axle is pivoted in journals or bearings 15 mounted on the frame members 10 in transversely aligned relation. An adjusting means is provided for varying the angularity between the arms 16 of the axle 14 and the base members of the frame. This adjusting means may comprise any suitable apparatus, such as opposed threaded elements 17 swingably attached at 19 to the frame members 10 and arranged to pass through the threaded brackets 20 on the arms 16. For convenience, the extremities of the threaded elements 17 may be formed into the shape of a crank handle 21 so that the threaded elements may be readily rotated to raise or lower the arms 16 with respect to the frame. Obviously, the axle 14 may either be one continuous U-shaped element, or may be in the form of two separate arms connecting each wheel to its respective side of the frame. By adjustment of the threaded elements 17, the wheels 12 may be raised or lowered with respect to the frame.

A sprocket 22 is mounted upon the wheel hub of one of the wheels 12. A second sprocket 23 is mounted upon a transverse shaft 24 supported by bearings 25 mounted on the frame 10. A chain 26 connects the sprockets 22 and 23 so as to drive the shaft 24 as the wheels 12 rotate.

A bevel gear 27 is mounted on the shaft 24 to rotate therewith. A cooperating bevel gear 29 is mounted on a right angular shaft 30 extending longitudinally of the harvester and supported by a suitable bearing 31 secured to the frame 10. An eccentric 32 is provided on the shaft 30, and a pitman 33 is connected to the eccentric 32. The pitman is pivotally connected to a transversely slidable sickle bar 34 which is provided with a central tooth 35 reciprocable between knives 36 mounted upon adjacent frame members 10. Thus as the corn picker moves along the ground, rotating the wheels 12, the sickle bar 34 will reciprocate transversely of the direction of movement of the corn picker, the tooth 35 reciprocating between the blades 36 to cut off the stalks at a point near the surface of the earth.

Also mounted upon the shaft 24 I provide a pair of bevel gears 37 which engage cooperable bevel gears 39 mounted at the lower extremity of parallel shafts 40. The shafts 40 are supported by suitable bearings 41 secured to the frame 10 and are also supported near their upper extremity by upwardly inclined frame members 42. These frame members 42 connect the forward ends of the frame members 10 and suitable framework later described on the vertically extending frame members 11 at the rear end of the harvester.

Mounted near the extremities of the bevel gears 39 on the shafts 40, I provide a pair of opposed sprockets 43 secured to the shafts 40 to rotate therewith. Sprockets 44 are mounted upon idle shafts 45 supported by the bearing brackets 41. Conveyor chains 46 are mounted upon the sprockets 43 and 44 and the sprockets are so arranged as to present substantially parallel adjacent conveyor chain portions having flights 47 thereupon for carrying the corn stalks past the sickle bar 34. Accordingly upon movement of the harvester over the ground rotation of the wheels 12 will cause simultaneous rotation of the conveyor chains 46 to draw any corn stalks positioned therebetween past the sickle bar 34.

A pair of opposed conveyor chains 47 are provided along the inclined frame members 42 to draw the corn stalks towards the roller mechanisms. The chains 47 are mounted upon sprockets 49 secured to the shafts 40 for rotation therewith, and are guided by idle sprockets 50 and 51, the latter sprockets being located at the entrance or forward end of the frame. The sprockets 50 and 51 permit the chains 47 to be relatively far apart at the entrance or forward end of the frame and to converge together as they are inclined upwardly. Thus a stalk which is somewhat out of line in a row will be engaged between the conveyor chains 47 and conveyed toward the rollers.

The conveyor chains 47 may extend to the upper extremity of the apparatus. However, for simplifying the drive mechanism I disclose the chains 47 as terminating at the sprockets 49 and provide a second pair of conveyor chains 52 to convey the stalks from the sprockets 49 to a point adjacent the upper extremity of the machine. The conveyor chains 52 are supported by sprockets 53 mounted upon the shafts 40 and upon idle sprockets 54 secured to the frame members 42 near the upper extremity thereof. The chains 52 are so supported as to provide substantially parallel adjacent conveyor portions to convey the stalks toward the roller mechanism.

In order to move the corn picker over the ground I provide a tongue 55 which is connected at 56 to any suitable power supply, such as a tractor or the like. The tongue 55 comprises a pair of divergent tongue forming members 57 which are connected along aligned pivots 59 to the frame 10. Mounted upon the tongue 55 I provide a lever 60 pivoted to the tongue at 61. This lever 60 is provided with a suitable pawl device 62 which engages a notched quadrant 63 on the tongue 55. The pawl 62 may be released by a conventional handle element 64 pivoted to the lever 60, and the pawl and quadrant permits the lever to be maintained in any set relationship. A connecting rod 65 is pivoted at its forward end to the lever 60 somewhat above the pivotal connection 61 of this lever with the tongue 55, and this rod is also pivotally connected at its rear end to one of the vertical frame members 11. Accordingly, by pivoting the lever 60 the distance between the pivot 61 of the lever and the vertical frame member 11 may be increased or decreased, thus changing the angularity of the frame of the harvester with respect to the tongue 55. By this means the frame may be adjusted into approximately parallel relationship with the surface of the earth.

Extending from the tractor, or other power device not illustrated in the drawings, I provide a drive shaft 66 which is connected by a suitable universal joint 67 to the drive shaft member 68 supported by suitable supporting brackets 70 to the frame members 10 and 11. A bevel gear 71 is mounted on the drive shaft portion 69 to rotate therewith, and this bevel gear engages a cooperable bevel gear 72 on a transversely extending drive shaft 73. The drive shaft 73 acts in the manner which will now be described to drive the various rollers and also to drive the balance of the conveying mechanism to the rollers. The shaft 73 is supported by suitable bearings 74 on the frame members 11.

A bevel gear 75 is provided on the shaft 73 and cooperates with a second bevel gear mounted upon a vertically extending shaft 76 supported by the frame members 11. The shaft 76 is provided at its upper extremity with a sprocket 77. A second sprocket 79 is provided on a vertical shaft 80 extending into proximity with the rear end of the conveyor chains 52. A chain 81 connects the sprockets 77 and 79 so as to drive the same in unison.

A second shaft 82 extends in parallel spaced relation to the shaft 80. Cooperable gears 83 and 84 on the shafts 80 and 82 respectively are engageable together to drive the shafts 80 and 82 in unison. The shaft 82, as well as the shaft 80, is supported by laterally extending frame members 85 secured to the vertical frame members 11. Pulleys 86 are provided near the lower extremities of the shafts 80 and 82, and cooperable pulleys 87 are pivotally secured to the frame members 85 at a point directly above the forward end of the rollers, which will be later described in detail. V belts 89 connect the pulleys 86 and 87 and act to convey the corn stalks therebetween from the conveyor chains 52 to the rollers, which will be later described in detail. Means may be provided to resiliently mount the pulleys 87 for movement toward or away from one another so as to resiliently engage the stalks supported between the belts 89. For the purpose of simplicity this resilient supporting means has not been illustrated in detail in the drawings.

A supporting plate 90 is provided on the frame members 11. This plate 90 may be inclined forwardly and downwardly as illustrated, the angularity of this plate may vary under different conditions. I have found that in some instances the rollers operate most successfully when the axes thereof are inclined at an angle of approximately sixty degrees from the horizontal with the axes thereof. In other instances, however, I have found that the rollers may be mounted on vertical axes with very successful results. Therefore, I do not wish to be limited to the particular angularity of the rollers illustrated, and while this angularity has certain definite advantages, the mounting of the rollers on vertical axes also has definite advantages.

A pair of plates 91 is secured to the frame members 85. Supported between the plates 90 and 91 I provide two pairs of rollers. The rollers 92 of one pair thereof are designed as pulling rollers to pull the stalks through the apparatus. The second pair of rollers 93 may be known as buffer rollers and are arranged to bend the ears away from the stalk and to thus break the ears off the stalk. Figure 4 of the drawings illustrates diagrammatically the mounting of the upper ends of the rollers 92 and 93. As illustrated the plates 91 are secured in laterally spaced relationship and one roller 92 is securely mounted with its axis 94 rotatably supported by the plate. The axis 95 of the remaining roller 92 is supported in a bearing block 96 which is slidable in a transverse slot 97 in the plate 91. A spring 99 is provided between an end closure and the slot 97 and the bearing block 96 so as to normally urge the rollers 92 toward one another. However, as the stalks of corn pass between the rollers the spring may compress sufficiently to permit the rollers to separate.

The rollers 93 are mounted in fixed relation, the axes thereof being rotatably supported by the plates 90 and 91. Fins 100 are provided on the rollers 93. These fins 100 are formed of flexible material, or of flexible and resilient material and normally extend substantially radially from the surface of the roller. These fins are possessed of sufficient rigidity to engage an ear of corn and to bend or fold the same downwardly, thus tending to break off the ear from the stalk. These fins will, however, flex under pressure so as to permit the stalks and leaves to pass therebetween.

As illustrated in Figure 5 of the drawings, the rollers 92 are preferably formed of resilient material so as to compress when stalks pass therebetween. The composition of these rolls depends upon the particular type of corn being harvested and may vary under different conditions.

The various rolls 92 and 93 are driven in the manner illustrated in Figures 1, 2, and 6 of the drawings. A bevel gear 101 on the shaft 73 is engageable with a cooperable bevel gear 102 on the axis 94 of one roller 92. Thus upon rotation of the power drive shaft 66 the bevel gears 101 and 102 impart a rotary movement to one of the rollers 92. The remaining rollers are operated by the drive mechanism, best illustrated in Figure 6 of the drawings. A sprocket 103 is mounted upon the axis 94 of the driven roller 92. A similar sprocket 104 is provided on the axis 95 of the companion roller 92. As illustrated in Figure 6, the lower end of the shaft 95 is also resiliently urged toward the companion roller 92 by means of a spring 105, and the roller 92 may move in its entirety away from the driven roller 92.

A sprocket 106 is mounted upon the shaft 107 of one roller 93. A second sprocket 109 is mounted upon the shaft 110 of the remaining roller 93. An idle sprocket 111 is mounted upon the plate 90. An idle sprocket 112 is urged by a spring 113 anchored at 114 to the plate 90 in a manner to tighten the chain 115 connecting the various sprockets described.

The chain 115 extends on one side of the sprocket 103 and on the opposite side of the sprocket 104, thus rotating the rolls 92 in opposite directions. The idle sprocket 111 maintains the chain in engagement with the sprocket 104. The chain extends around the sprocket 109 on the shaft 110 of one of the rollers 93 and extends about the opposite side of the other sprocket 106 on the shaft 107 of the other roller 93. Thus the rollers 93 also operate in opposite directions. The idle gear 112 and the spring 113 take up slack in the chain 115 when the sprockets 103 and 104 are urged apart due to separation of the rollers 92.

Figures 7, 8, 9, and 10 of the drawings disclose successive steps in the operation of my corn picker. Figure 7 illustrates the stalk engaged between the rollers 92 and an ear of corn B approaching the buffer rollers 93. The rollers 93 operate in such a manner as to prevent the ear of corn B from entering therebetween and tend to bend the ear away from the stalk C.

Figure 8 illustrates the ear of corn B bent away from the stalk by one roller 93 due to the formation of the roller and the direction of rotation thereof.

Figure 9 illustrates the ear of corn B bent at approximately right angles with respect to the stalk of corn C. I have found that most ears of corn are entirely broken away from the stalks by the time they are bent at right angles with respect to the stalk when the ears are green. Further bending is necessary if the corn is dry, and it is also preferable to provide somewhat stiffer fins 100 on the buffer rolls when my apparatus is used for picking dry corn.

Figure 10 illustrates the final step in the operation of my corn picker, showing the ear of corn B folded back to more than right angles from the stalk C. If the corn is green the ears will in almost all instances have broken away from the stalk by this position of the operation. However, subsequent operations of the pulling rollers 92 will tend to break the ear entirely from the stalk regardless of the amount of bending necessary to accomplish this result.

The operation of my corn picking apparatus is believed obvious from the description stated above. The corn enters the device between the conveyor chains 47 at the entrance end thereof where the idle sprockets 51 are located. The stalks are conveyed to the second conveyor chains 52 which continue conveying the stalks until they are engaged between the V belts 89. These V belts 89 draw the upper extremities of the stalks between the pulling rollers 92 which operate to draw the stalks entirely through the machine.

During the time the stalks are being conveyed by the conveyor chains 47 and 52, the lower ends of the stalks are engaged between the conveyor chains 46 and the stalks are severed near the ground by the sickle bar 34. This permits the lower ends of the stalks to be elevated on an inclined pan 116 which prevents the stalks from being entangled in the gear mechanism at the lower extremities of the shafts 40.

The upper ends of the rollers 93 are tapered to a smaller diameter so as to permit the stalks to engage between the rollers 93 without considerable interference by the fins 100 of the rollers 93. The manner in which the upper ends of the rollers 93 are tapered can be seen in Figure 2 of the drawings. A belt conveyor 117 extends transversely of the apparatus, being supported at one end by a roller 119 supported by the frame members 10 and 11. This conveyor 117 extends beneath the rollers 92 and 93 to catch the ears of corn as they are broken from the stalks by the rollers 93. The conveyor 117 extends laterally to deposit the corn in a suitable receptacle or separate vehicle, not illustrated in detail in the drawings. The conveyor 117 is driven at its outer extremity by the shaft 120 connected by a universal joint 121 to the transversely extending shaft 73.

In accordance with the patent statutes, I have described the principles of construction and operation of my corn picker and while I have endeavored to set forth the best embodiment thereof, I desire to have it understood that obvious changes may be made within the scope of the following claims without departing from the spirit of my invention.

I claim:

1. A corn picker comprising a frame, a pair of substantially parallel pulling rollers, means supporting said rollers on said frame in position to engage the top of a stalk of corn and to pull the stalk therebetween from the upper end thereof, a pair of substantially parallel buffer rollers between which the stalks must pass in travelling toward said pulling rollers, said buffer rollers rotating in opposite directions and in a manner to bend down ears of corn on said stalks, and said pulling rollers rotatable in the opposite direction to pull the stalks between said buffer rollers, and means for rotating said pulling rollers and said buffer rollers.

2. A corn picker comprising a frame, a substantially parallel pair of rollers, means supporting said rollers on said frame in position to engage a stalk of corn near the upper end thereof and to draw the stalk between said rollers from the upper end thereof, a pair of substantially parallel buffer rollers rotatable in a direction opposite to the direction of rotation of said pulling rollers, said buffer rollers engaging the stalk below the point on the stalk engaged by said pulling rollers, and means on said buffer rollers to flexibly engage ears of corn on the stalks passing therebetween and to bend said ears downwardly with respect to said stalks.

3. A corn picker comprising a frame, a pair of forwardly and upwardly inclined substantially parallel pulling rollers arranged to grip a corn stalk therebetween and to pull the same between said rollers, a pair of buffer rollers secured in substantially parallel relation on said frame, said buffer rollers being forwardly and upwardly inclined and positioned with relation to said pulling rollers so that said buffer rollers will engage a portion of the corn stalk below that engaged by the pulling rollers, and means for rotating said pulling rollers in one direction and rotating said buffer rollers in the opposite direction.

4. A corn picker comprising a frame, two pairs of rollers rotatably secured to said frame and extending in substantially parallel relationship, the rollers of one pair comprising pulling rollers, means supporting said rollers on said frame in position to engage a stalk of corn near the top thereof and to draw the stalk between said rollers from the upper end thereof, the other of said rollers comprising buffer rollers between which the stalks are drawn by said pulling rollers, means for rotating said pulling rollers in a direction to clamp the stalk therebetween and to move the stalk between the rollers from top to bottom of the stalk, and means for rotating the buffer rollers in a direction to engage the stalks and impart a force against said stalk opposite the direction of movement of the stalk clamped by said pulling rollers, said buffer rollers bending the ears of corn from said stalks and thereby breaking the ears from the stalk.

5. A corn picker comprising a frame, a pair of pulling rollers rotatably secured to said frame in parallel relationship, a substantially parallel pair of buffer rollers rotatably secured to said frame adjacent said pulling rollers, means rotating said pulling rollers in one direction and rotating said buffer rollers in the opposite direction, and means for conveying stalks of corn to said pulling rollers, means on said frame for guiding the upper ends of the stalks between said pairs of rollers in advance of the other ends thereof, said pulling rollers engaging the upper extremity of said stalks and pulling the stalks between said pulling rollers from the upper end thereof.

6. A corn picker comprising a frame, a pair of pulling rollers rotatably secured to said frame in substantially parallel relationship, a second pair of substantially parallel rollers rotatably secured to said frame adjacent said pulling rollers, means on said frame conveying the upper extremities of corn stalks between said pulling rollers before the lower ends of the stalks are so engaged, and means rotating said pulling rollers in a direction to pull the corn stalks therebetween from top to bottom of each stalk, and means rotating said second rollers in a direction opposite the direction of rotation of said pulling rollers to strip the ears of corn from said stalks as they pass between said second rollers.

7. A corn picker comprising a frame, a pair of substantially parallel pulling rollers mounted on said frame in forwardly and upwardly inclined position, a second pair of rollers secured in substantially parallel relationship adjacent and parallel to said pulling rollers, means conveying the upper extremities of corn stalks between said pulling rollers, means for rotating said pulling rollers in a direction to pull said stalks therebetween and between said second rollers from the top to the bottom thereof, and means rotating said second rollers in a direction opposite the direction of rotation of said pulling rollers to bend the ears of corn outwardly and downwardly as said stalks pass therebetween.

8. A corn picker comprising a frame, a pair of substantially parallel forwardly and upwardly inclined pulling rollers rotatably secured to said frame, a pair of substantially parallel buffer rollers secured to said frame in substantially parallel relationship to said pulling rollers, means conveying the upper extremities of corn stalks between said pulling rollers, means operating said pulling rollers in a direction to pull said stalks therebetween and between said buffer rollers from top to bottom of the stalks, means rotating said buffer rollers in a direction opposite the direction of rotation of said pulling rollers to bend ears of corn on said stalks passing therebetween outwardly, and means for cutting off said stalks near the lower extremity thereof.

9. A corn picker comprising a frame, a pair of upwardly and forwardly inclined pulling rollers rotatably secured to said frame in parallel relationship, a pair of substantially parallel buffer rollers secured to said frame substantially parallel to said pulling rollers, means rotating said pulling rollers in one direction to pull corn stalks therebetween from top to bottom of the stalk, flexible webs on said buffer rollers, and means for rotating said buffer rollers in a direction of rotation opposite the direction of rotation of said pulling rollers, said fins engaging the ears of corn to bend the same outwardly and downwardly.

10. A corn picker comprising a frame, a stalk engaging device carried by said frame, and comprising spaced pulling rollers arranged in forwardly and upwardly inclined relation on said frame, a pair of substantially parallel buffer rollers secured to said frame in substantially parallel relationship to said pulling rollers, means rotating said pulling rollers in one direction to draw the stalks therebetween from top to bottom of the stalks, means on said buffer rollers to engage the ears of corn on said stalks and to bend the same downwardly, and means for operating said buffer rollers in a direction of rotation opposite the direction of rotation of said pulling rollers.

11. A corn picker comprising a portable frame, a pair of substantially parallel inclined conveyors arranged to engage stalks of corn and to hold them in a substantially upright position, means for cutting said stalks near the lower ends thereof while said stalks are engaged by said conveyor, a pair of upwardly and forwardly inclined pulling rollers between the upper ends of which said stalks are introduced by said conveyors, said pulling rollers engaging the stalks therebetween and pulling said stalks therethrough from top to bottom of the stalks, a pair of buffer rollers rotating in a direction opposite the respective direction of rotation of said pulling rollers, and means rotating said pulling rollers and said buffer rollers, rotating said buffer rollers in a manner to bend the ears of corn away from the stalks being pulled therebetween by said pulling rollers.

12. A corn picker comprising a portable frame, an upwardly and rearwardly inclined conveyor means arranged to engage corn stalks and to hold them in a substantially erect position, means for cutting the stalks near the lower ends thereof during the conveying movement and simultaneously inclining said stalks rearwardly, a pair of pulling rollers between which the upper ends of said corn stalks are first engaged by said conveyor means, and a pair of buffer rollers secured to said frame for engagement with the stalks at a point lower than the engagement of said pulling rollers with said stalk, and means for operating said rollers in opposite directions, said pulling rollers drawing said stalks between said buffer rollers, and said buffer rollers resisting this pulling movement and bending outwardly ears of corn on said stalks.

13. A corn picker comprising a portable frame, a pair of pulling rollers arranged with one end thereof substantially above the other end thereof, said pulling rollers being arranged in substantially spaced parallel spaced relationship, a second pair of substantially parallel rollers arranged substantially parallel to said first named pulling rollers, conveying means on said frame engageable with the upper extremities of corn stalks between said pulling rollers at the highest end thereof, said pulling rollers pulling said stalks between said second rollers, and means operating said pulling rollers in one direction to draw the stalks therebetween from top to bottom and rotating the second rollers in the opposite direction to bend the ears of corn downwardly as the stalks travel therebetween, and conveying means below said second rollers onto which the ears of corn bent away from said stalks may fall.

STEVEN T. EKHOLM.